US009715580B2

(12) United States Patent
Paquet et al.

(10) Patent No.: US 9,715,580 B2
(45) Date of Patent: Jul. 25, 2017

(54) PLAYER SPECIFIC LIMITED LICENSES

(75) Inventors: Philippe Louis Yves Paquet, Studio City, CA (US); Amy Beth Kalson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 743 days.

(21) Appl. No.: 13/009,605

(22) Filed: Jan. 19, 2011

(65) Prior Publication Data

US 2012/0184366 A1 Jul. 19, 2012

(51) Int. Cl.
G06Q 20/00 (2012.01)
G06F 21/10 (2013.01)

(52) U.S. Cl.
CPC ...... *G06F 21/10* (2013.01); *G06F 2221/2109* (2013.01); *G06F 2221/2137* (2013.01); *G06F 2221/2141* (2013.01)

(58) Field of Classification Search
USPC .......................................................... 705/59
See application file for complete search history.

(56) References Cited

U.S. PATENT DOCUMENTS

| 2003/0005135 | A1* | 1/2003 | Inoue ............... G06F 21/10 709/229 |
| 2004/0158731 | A1* | 8/2004 | Narin et al. ............. 713/200 |
| 2005/0119977 | A1* | 6/2005 | Raciborski ................ 705/59 |
| 2005/0131711 | A1* | 6/2005 | Bouriant et al. ............. 705/1 |
| 2006/0053080 | A1* | 3/2006 | Edmonson et al. ........... 705/59 |
| 2006/0069652 | A1* | 3/2006 | Ebihara et al. ............. 705/59 |
| 2006/0106726 | A1* | 5/2006 | Raley et al. ............... 705/59 |
| 2007/0005504 | A1* | 1/2007 | Chen et al. ............... 705/59 |
| 2007/0013515 | A1* | 1/2007 | Johnson et al. ........... 340/568.1 |
| 2007/0239617 | A1* | 10/2007 | Kim ........................ 705/59 |
| 2008/0103977 | A1* | 5/2008 | Khosravy et al. ........... 705/59 |
| 2008/0113789 | A1* | 5/2008 | Canessa et al. ............ 463/29 |
| 2008/0120241 | A1* | 5/2008 | Kim ........................ 705/59 |
| 2008/0147530 | A1* | 6/2008 | Kwan et al. ............... 705/34 |
| 2010/0333211 | A1* | 12/2010 | Schonfeld et al. ........... 726/28 |
| 2011/0131663 | A1* | 6/2011 | Kaikuranta ........... G06F 3/0486 726/28 |

OTHER PUBLICATIONS

World of Warcraft, 2004, Blizzard Entertainment, p. 136 and 140.*

* cited by examiner

*Primary Examiner* — John Hayes
*Assistant Examiner* — John M Winter
(74) *Attorney, Agent, or Firm* — Patterson + Sheridan, LLP

(57) ABSTRACT

One embodiment of the present invention sets forth a method for providing a user access to a gaming environment without a full license. In operation, a license generator receive a request to generate a temporary license for a user not having access to the gaming environment from a primary user having a full license. The license generator then generates the temporary license based on license information associated with the full license belonging to a primary user. The user can then access the gaming environment via the temporary license, but may only be given restricted access to the gaming environment.

16 Claims, 5 Drawing Sheets

PLAYER SPECIFIC LIMITED LICENSES

BACKGROUND OF THE INVENTION

Field of the Invention

Embodiments of the present invention relate generally to gaming systems and, more specifically, to player specific limited licenses.

Description of the Related Art

Computer-based activities, both on-line and stand-alone, are becoming prevalent. Activities may include games, such as recreational games, educational games, learning games, and other games, reading and the electronic delivery of books (e-books), use of interactive toys, or any other network-based activity.

One type of game is a multi-player game, where several users play a game together. Typically, a user must purchase a license to play a multi-player game, and, often, a user who has purchased a license to play the multi-player game would like to play with other users who do have licenses to play the multi-player game. In such a scenario, however, the user who has purchased a license to play the multi-player game cannot play the game with the users he/she would like to play with until those users purchase licenses. Such a restriction often results in a user who has purchased a license not being satisfied with the game experience since he/she does not get to play the game with a desired user.

As the foregoing illustrates, what is needed in the art is a mechanism for providing access to a game that a user does not have a license to access.

SUMMARY OF THE INVENTION

One embodiment of the present invention sets forth a computer-implemented method for accessing a gaming environment without a license. The method includes the steps of receiving a request to generate a temporary license for a user not having access to the gaming environment, generating the temporary license based on license information associated with a first license belonging to a primary user, wherein the license information is stored in a license store, and the temporary license enables restricted access to the gaming environment, and transmitting the temporary license to the first user.

Advantageously, via the license generation mechanism described herein, a primary user can sponsor a temporary user to play in a multi-player game with the primary user. This allows the primary user to enjoy a greater gaming experience since he/she engages in a game with users whom that he/she chooses to play with. In addition, the temporary users get exposed to the gaming experience via the temporary licenses and, thus, may convert a temporary license into a full license.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
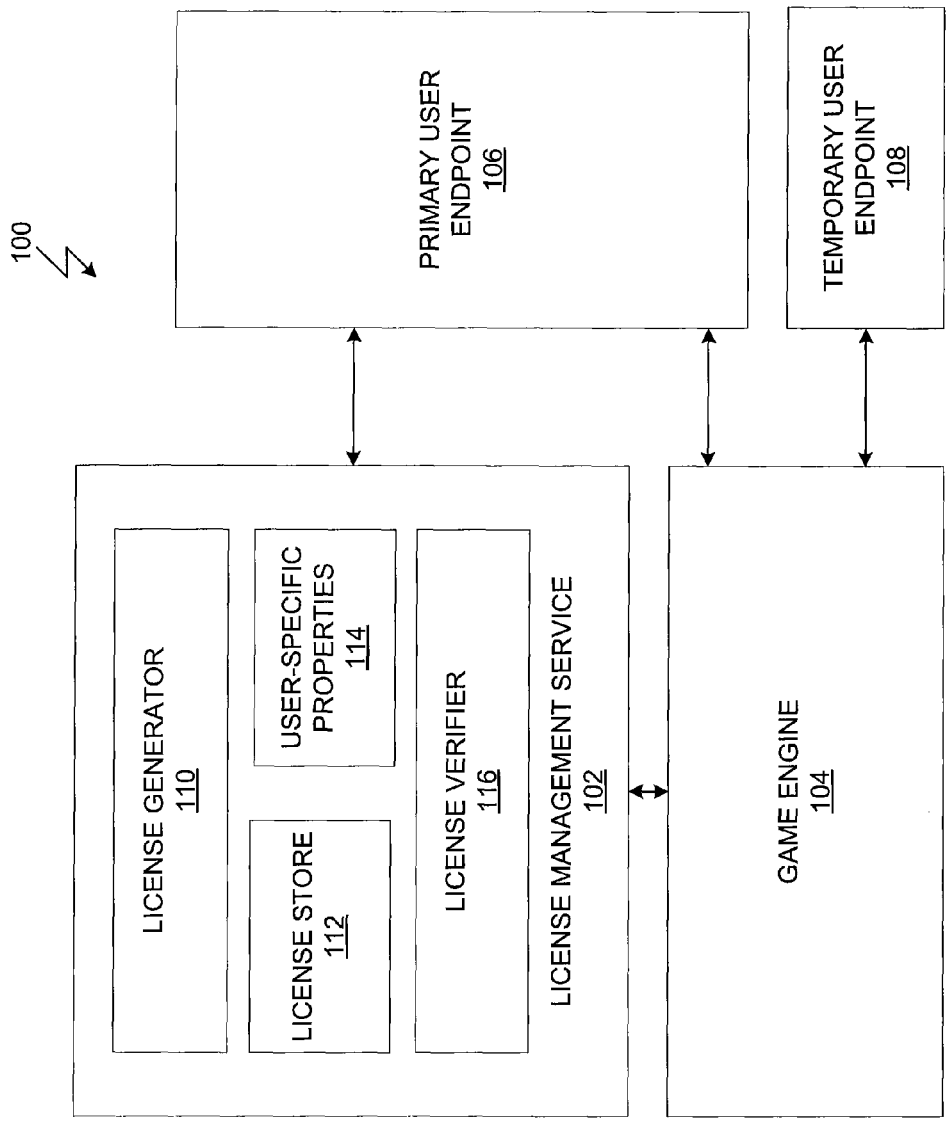
FIG. 1 illustrates a license management service within a game environment, according to one embodiment of the invention.

FIG. 1 illustrates a license management service 102 within a game environment 100, according to one embodiment of the invention. As shown, the game environment 100, along with the license management service 102, also includes a game engine 104 and a primary user endpoint 106 and a temporary user endpoint 108.

The game engine 104 is a game processing environment associated with a game. A user operating the primary user endpoint 106 (referred to herein as the "primary user") has a full license to engage in the game associated with the game engine 104. A full license allows the primary user to access all aspects and features of the game. In addition, the full license allows the primary user to grant temporary game privileges, via a temporary license, to a temporary user. Such a temporary user operates the temporary user endpoint 108. The licenses associated with the primary user and the temporary user are managed by the license management service 102. The following discussion describes how a temporary license is generated and verified and how the game engine handles a user with a full license and a user with a temporary license.

The license management service 102 includes a license generator 110, a license store 112, user-specific properties 114 and a license verifier 116. The license management service 102 performs two main functions, license generation and license verification. A license associated with the primary user may be generated dynamically by the license generator 110 included in the license management service 102 when the primary user first purchases the rights to access the game. Alternatively, the license generator 110 may generate a full license that comes bundled with the game, and the primary user activates the full license when the game is purchased and accessed.

A full license associated with the primary user is stored in the license store 112. In one embodiment, the license store 112 is a database executing on a processor. The information associated with the full license that is stored in the license store 112 typically includes the following:

License ID: A unique identifier associated with the license,

License Type: Indicating that the license is a full license,

Primary User ID: An identification, such as a user name, associated with the primary user, and Expiration: An expiration date/time, if any, when the primary license expires.

In addition, the primary user may be associated with one or more user-specific properties stored in the user-specific properties 114. A user-specific property can include personal information associated with the primary user, such as age, sex, interests, etc. In addition, a user-specific property associated with the primary user also indicates whether the user has privileges to generate temporary licenses. Again, a temporary license is a license that is associated with a full license and allows a temporary user access to the game associated with the game engine 104. A primary user having the privileges to generate temporary licenses may request the license generator 110 to generate a temporary license for distribution to a particular user who then becomes a temporary user. In one embodiment, the primary user can request the generation of a limited number of temporary licenses. In addition, the primary user can request that a temporary license generated for a particular temporary user be revoked. A revoked temporary license can then be distributed to a different user.

In operation, a primary user operating the primary user endpoint 106 transmits a request to the license management service 102 for generating a temporary license based on the full license associated with the primary user. In one embodiment, the primary user transmits the request directly to the license management service 102. In an alternate embodiment, the primary user transmits the request to the license management service 102 via the game engine 104. The request includes the primary user ID of the primary user. The request can, optionally, include the license ID associated with the full license and an identification associated with the user to whom the temporary license is to be assigned.

In response to the request, the license generator 110 first determines, via the user-specific properties, whether the primary user associated with the primary user ID included in the request has the privilege to generate a temporary license. If the primary user does not have the privilege to generate a temporary license, then the license generator 110 transmits a response to the primary user indicating that a temporary license could not be generated. If, however, the primary user does have the privilege to generate a temporary license, then the license generator 110 generates a temporary license associated with the full license belonging to the primary user.

The temporary license is then transmitted to the primary user for distribution to a user who will then become a temporary user of the game associated with the game engine 104. In an alternative embodiment, if the primary user provided an identification associated with the user to whom the temporary license is to be assigned, then the temporary license is transmitted directly to the user. Information associated with the temporary license is also stored in the license store 112. The information associated with the temporary license that is stored in the license store 112 typically includes the following:

License ID: A unique identifier associated with the license,
License Type: Indicating that the license is a temporary license,
Primary User ID: An identification, such as a user name, associated with the primary user to whom the full license associated with the temporary license belongs,
Temporary User ID: An identification, such as a user name, associated with the temporary user to whom the temporary license is assigned, and Expiration: An expiration date/time, if any, when the temporary license expires. The expiration of a temporary license may be tied to the expiration of the primary license associated with the temporary license. In such a scenario, the temporary license may expire when the primary user holding the primary license no longer accesses the gaming environment. Alternatively, the temporary license may have an independent expiration that may, optionally, be specified by the primary user.

Certain restrictions are imposed on a temporary user accessing a game associated with the game engine 104 using a temporary license. One such restriction is a temporary user can only engage in the game if the primary user to whom the full license associated with the temporary license is also accessing the game. In some embodiment, the temporary user may be restricted to engaging in the game when he/she is playing in a multi-player scenario with the primary user and one or more other users. In addition, certain features and/or levels of the game that are available to the primary user may be unavailable to the temporary user.

In order to engage in a game, a user provides a user identification and/or license identification to the game engine 104. The game engine 104, in turn, transmits a request to the license verifier 116 within the license management service 102 to verify the license associated with the user. If just the user identification is provided, then the license verifier 116 looks up the license information associated with the user in the license store 112 based on the user identification. If the license information is provided, then the license verifier 102 looks up the license information associated with the user in the license store 112 based on the license identification. Based on the license information, the license verifier 116 determines, first, whether the license is valid and, two, whether the license is a temporary license.

To determine whether the license is valid, the license verifier 116 determines whether the license information indicates that the license is expired. If the license is expired, then the license is not valid, and the license verifier 116 transmits an indication to the game engine 104 that the license is not valid. If the license has not expired, however, the license verifier determines based on the license type indicated by the license information, whether the license is a temporary license. If the license is not a temporary license, then the license verifier 116 transmits an indication to the game engine 104 that the license is valid and the user is a primary user having a full license. If, however, the license is a temporary license, then the license verifier 116 transmits an indication to the game engine 104 that the license is valid and the user is a temporary user having a temporary license associated with a full license belonging to the primary user indicated by the license information.

When the game engine 104 receives an indication from the license verifier 116 that the license transmitted for verification is invalid, the game engine 104 does not allow the user to engage in the game. When, however, the indication received from the license verifier 116 indicates that the license transmitted for verification is valid, then the game engine 104 allows the user to engage in the game subject. If the user is a temporary user, the game engine 104 allows the temporary user to engage with the game in a restricted manner, as described above.

In one embodiment, the license management service 102 executes on a dedicated server and communicates with the game engine 104 and user end points, such as the primary user endpoint 106, via a network. In an alternative embodiment, the license management service 102 executes on the same server as the game engine 104. It will be recognized that any configuration of the game environment 100 is within the scope of this invention.

Figure 2:
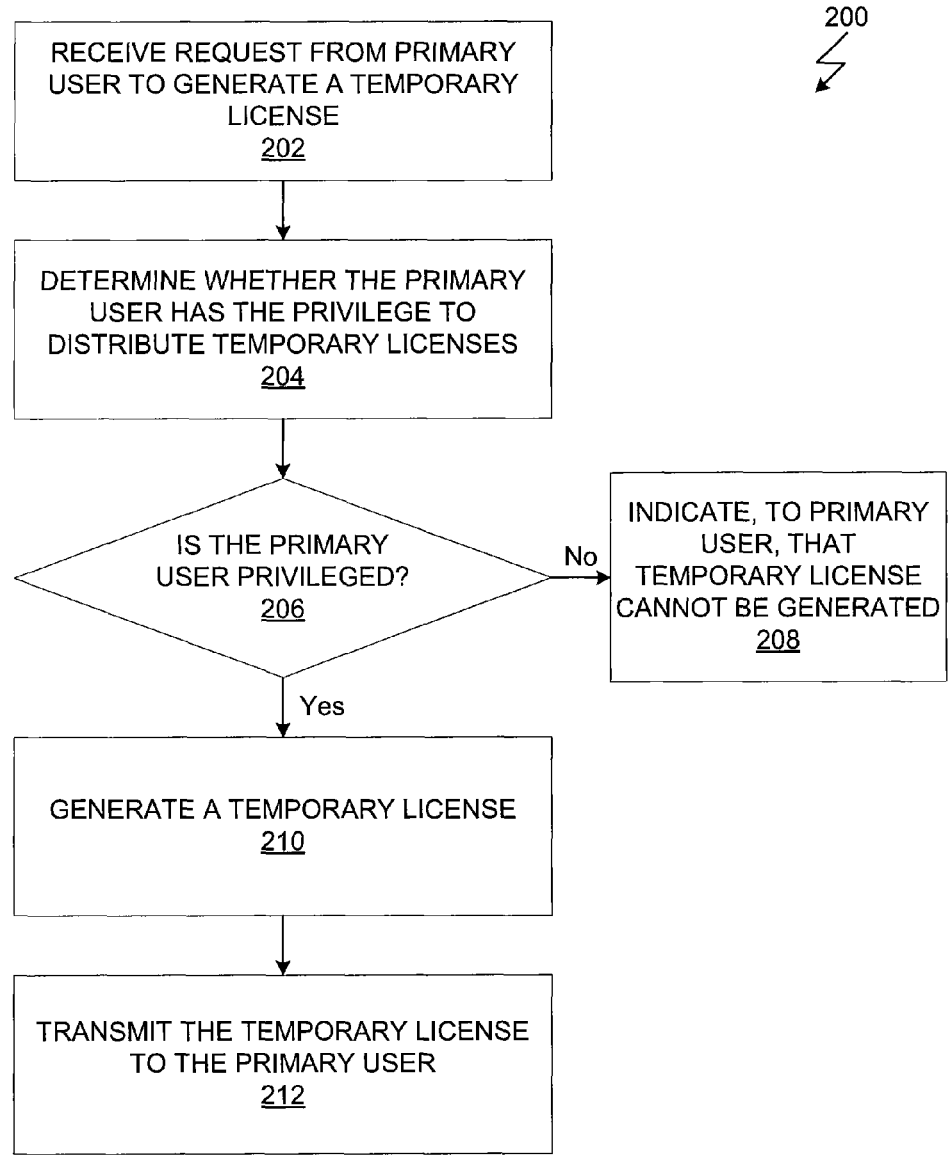
FIG. 2 is a flow diagram of method steps for generating a temporary license based on a full license, according to one embodiment of the invention.

FIG. 2 is a flow diagram of method steps for generating a temporary license based on a full license, according to one embodiment of the invention. Although the method steps are described in conjunction with the system of FIG. 1, persons skilled in the art will understand that any system configured to perform the method steps, in any order, is within the scope of the inventions.

The method begins at step 202, wherein the license generator 110 included in the license management service 102 for generating a temporary license from a primary user having a full license. At step 204, the license generator 110 determines whether the primary user has the privilege to distribute temporary license. More specifically, the license generator 110 determines, via license information associated with the primary license and stored in the license store 112, whether is the primary license is still valid, i.e., not expired. Further, the license generator 110 determines, via properties associated with the primary user and stored in the user-specific properties 114, whether the primary user can distribute anymore temporary licenses.

At step 206, if the full license is not expired and the primary user can distribute a temporary license, then the license generator 110 determines that the primary user has the privilege to distribute temporary license and the method 200 proceeds to step 210. At step 210, the license generator generates a temporary license based on the full license of the primary user. The contents of a temporary license are described above. Most importantly, the temporary license is tied to the primary license and, in one embodiment, a user can only access a game of the game engine 104 via a temporary license when the primary user having the full license that is tied to the temporary license is also accessing the game.

At step 212, the temporary license generated at step 210 is transmitted to the primary user for distribution to another user for temporarily accessing the game engine 104. In an alternate embodiment, the temporary license is transmitted directly to the temporary user identified by the primary user.

Referring back to step 206, if the full license has expired and/or the primary user cannot distribute a temporary license, then the license generator 110 determines that the primary user does not have the privilege to distribute temporary license and the method 200 proceeds to step 208. At step 208, the license generator 110 indicates, to the primary user, that a temporary license cannot be generated.

Figure 3:
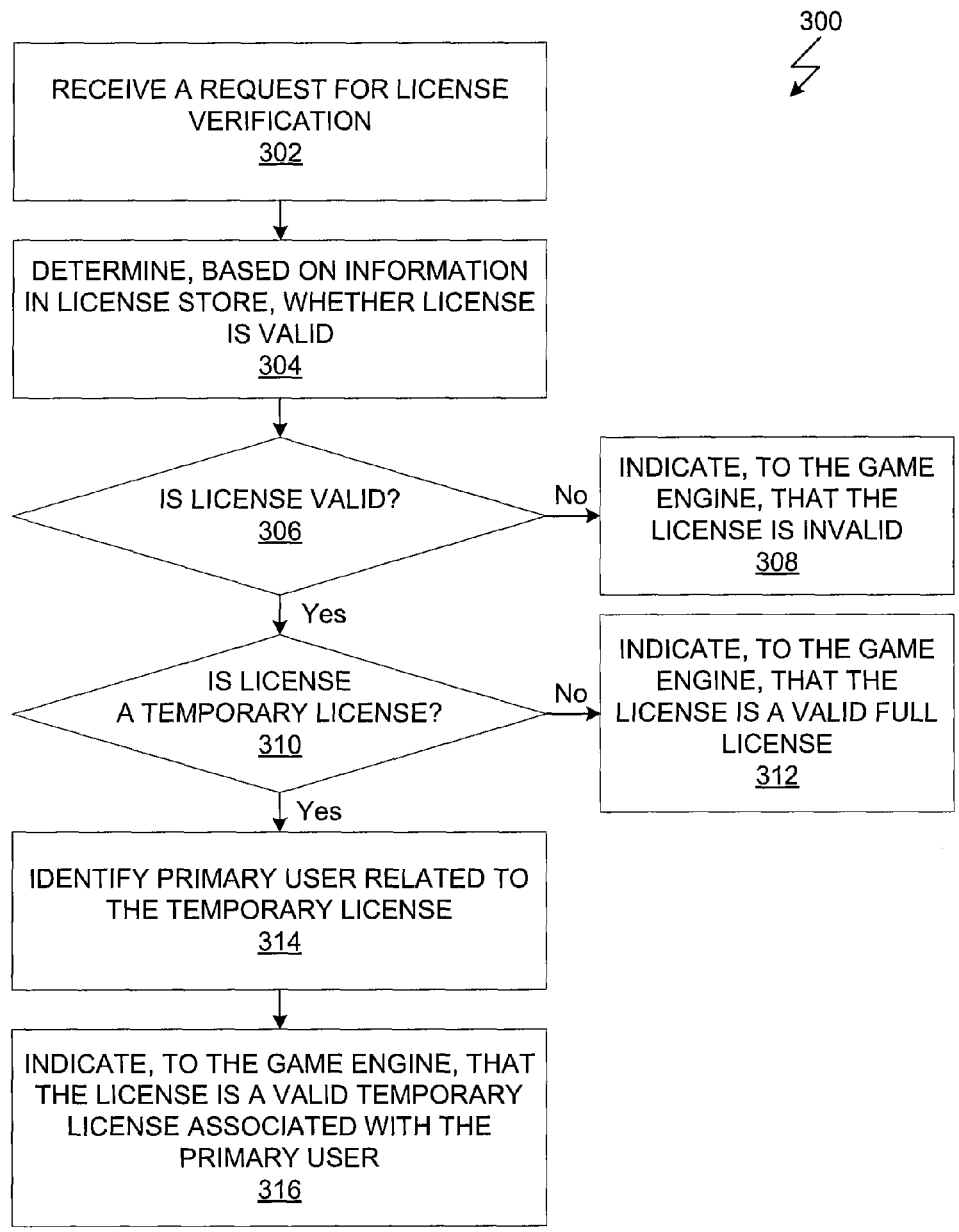
FIG. 3 is a flow diagram of method steps for verifying a license received from a user endpoint, according to one embodiment of the invention.

FIG. 3 is a flow diagram of method steps for verifying a license received from a user endpoint, according to one embodiment of the invention. Although the method steps are described in conjunction with the system of FIG. 1, persons skilled in the art will understand that any system configured to perform the method steps, in any order, is within the scope of the inventions.

The method 300 begins at step 302, where the license verifier 116 receives a request from the game engine 104 to verify a license. At step 304, the license verifier 116 determines, based on information associated with the license and stored in the license store 112, whether the license is valid. To make such a determination, the license verifier 116 determines whether the license has expired.

At step 306, if the license is valid, then the method 300 proceeds to step 310. At step 310, the license verifier 116 determines, based on the license type indicated by the license information, whether the license is a temporary license. If the license is a temporary license, then the method 200 proceeds to step 314, where the license verifier 116 identifies the primary user having the full license associated with the temporary license. At step 316, the license verifier 116 indicates to the game engine 104 that the license is a valid temporary license associated with the primary user identified at step 316. As previously described herein, the game engine may only allow a user access to a game via a temporary license when the primary user having the full license that is tied to the temporary license is also accessing the game.

Referring back to step 310, if the license is a temporary license, then the license verifier 116 indicates to the game engine 104 that the license is a valid full license.

Referring back to step 306, if the license is invalid, then the license verifier 116 indicates to the game engine 104 that the license is an invalid license.

Figure 4:
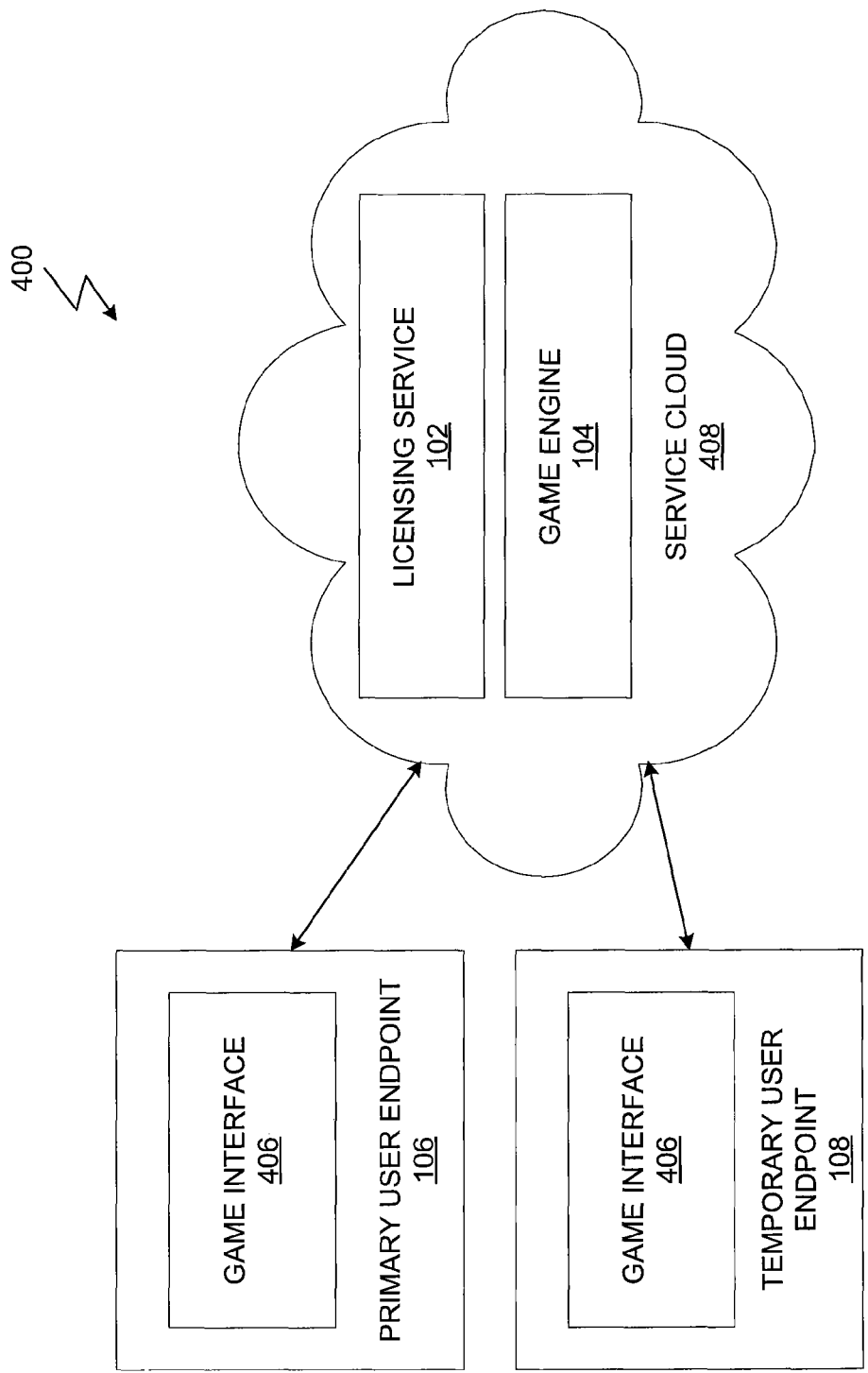
FIG. 4 illustrates a cloud computing environment configured to implement one or more aspects of the invention.

FIG. 4 illustrates a cloud computing environment 400 configured to implement one or more aspects of the invention. As shown, the cloud computing environment 400 includes the primary user endpoint 106, the temporary user endpoint 108 and a service cloud 408. The service cloud 408 includes a collection of resources that facilitate the execution of the different components of the game environment 100, namely the license management service 102 and the game engine 104. The primary user endpoint 106 and the temporary user endpoint 108 communicate with the service cloud 408 via a network (such as the Internet) and interact with the license management service 102 and the game engine 104 via the game interface 406.

Figure 5:
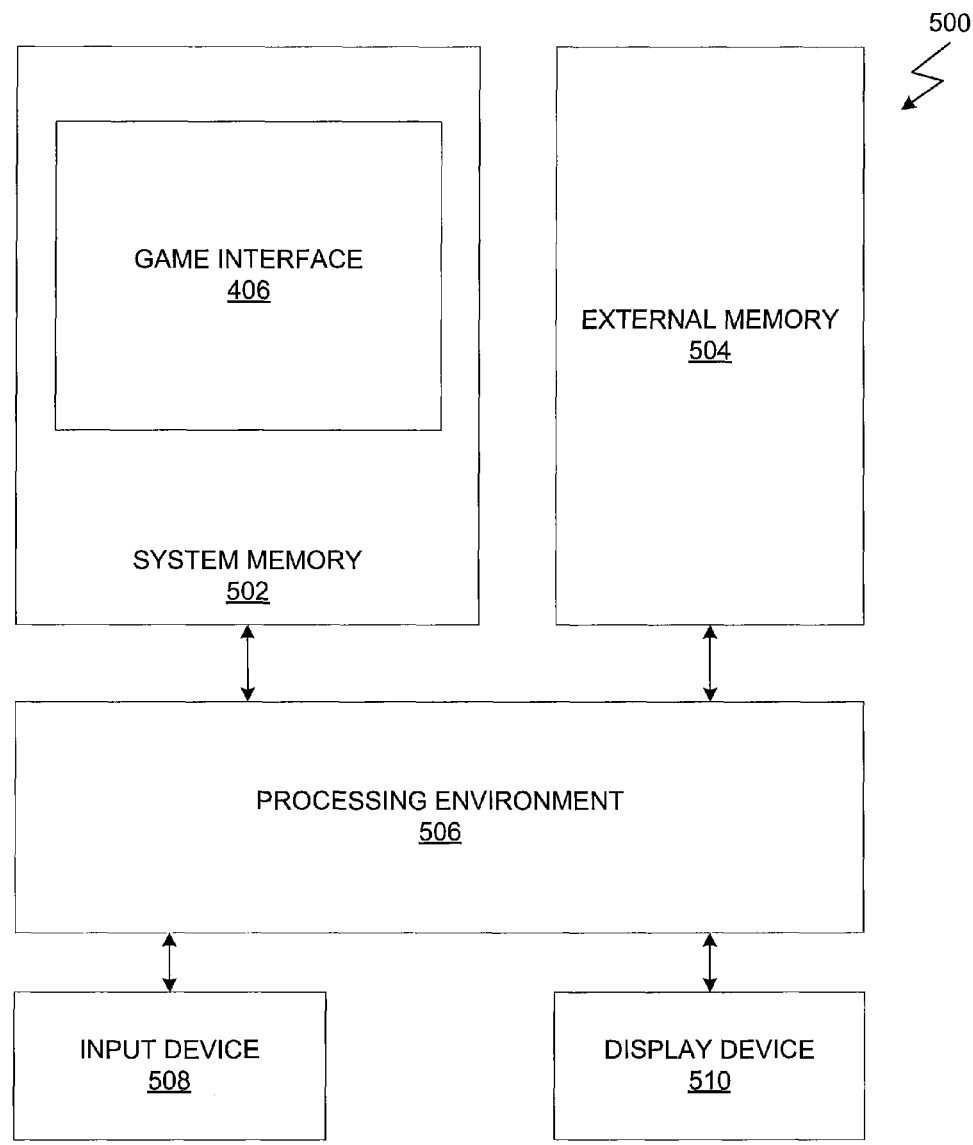
FIG. 5 is a block diagram of a system configured to implement one or more aspects of the invention.

FIG. 5 is a block diagram of a system 500 configured to implement one or more aspects of the invention. The system 500 could be the primary user endpoint 105 or the temporary user endpoint 108. As shown, the system 500 includes a system memory 502, an external memory 504, a processing environment 506, an input device 508 and a display device 510. The system memory 502 includes the game interface 406 described herein. The system memory 502 is a memory space, usually a random access memory (RAM), that temporarily stores software programs running within the system 500 at any given time. The processing environment 506 includes one or more processors that each executes a sequence of stored instructions associated with and/or transmitted from the various elements in the computer system 500 including the learning environment 100. The external memory 504 is a storage device, e.g. a hard disk, for storing data associated with the learning environment 100. The input device 508 is an end-user controlled input device, e.g. a mouse or keyboard, that allows a user to manipulate various aspects of the learning environment 100. The display device 510 may be a cathode-ray tube (CRT), a liquid crystal display (LCD) or any other type of display device.

FIGS. 4 and 5 show exemplary systems in which components of the game environment 100 can be implemented. Persons skilled in the art would recognize that the game environment 100 can be implemented in other types of systems or different portions of the game environment 100 can be implemented across two or more systems.

Advantageously, via the license generation mechanism described herein, a primary user can sponsor a temporary user to play in a multi-player game with the primary user. This allows the primary user to enjoy a greater gaming experience since he/she engages in a game with users whom that he/she chooses to play with. In addition, the temporary users get exposed to the gaming experience via the temporary licenses and, thus, may convert a temporary license into a full license.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for accessing a gaming environment, the method comprising:
   receiving, from a primary user, a request to generate a restricted license for a first user not having access to the gaming environment;
   determining, within a license store for the gaming environment, a license belonging to the primary user granting the primary user full access to the gaming environment;
   upon determining that the primary user has sufficient privilege to distribute restricted licenses, generating the restricted license granting the first user only partial access to the gaming environment, wherein the partial access prevents the first user from accessing at least one feature of the gaming environment that is accessible to the primary user, and wherein the partial access granted by the restricted license only allows the first user to access the gaming environment via the first license simultaneously with the primary user and at least a third user accessing the gaming environment;
   storing the generated restricted license within the license store, together with both (i) a first identifier that uniquely identifies the first user within the gaming environment and (ii) a second identifier that uniquely identifies the primary user within the gaming environment;
   receiving a request for the first user to access the gaming environment; and
   allowing the request from the first user to access the gaming environment, based on the restricted license, only in response to determining that the primary user and the third user are currently accessing the gaming environment.

2. The method of claim 1, wherein a property is associated with the primary user that indicates a number of restricted licenses the primary user has the authority to grant, and wherein determining that the primary user has sufficient privilege to distribute the restricted license further comprises determining that the number of restricted licenses is greater than zero.

3. The method of claim 1, wherein generating the restricted license is performed further responsive to determining that the license belonging to the primary user has not expired.

4. The method of claim 1, wherein the license information associated with the restricted license includes a reference to the license belonging to the primary user.

5. The method of claim 1, wherein the license information associated with the restricted license includes a time stamp indicating when the restricted license expires.

6. A non-transitory computer-readable medium storing instructions that, when executed by a processor, cause the processor to provide a user access to a gaming environment, by performing the steps of:
   receiving, from a primary user, a request to generate a restricted license for a first user not having access to the gaming environment;
   determining, within a license store for the gaming environment, a license belonging to the primary user granting the primary user full access to the gaming environment;
   upon determining that the primary user has sufficient privilege to distribute restricted licenses, generating the restricted license granting the first user only partial access to the gaming environment, wherein the partial access prevents the first user from accessing at least one feature of the gaming environment that is accessible to the primary user, and wherein the partial access granted by the restricted license only allows the first user to access the gaming environment via the first license simultaneously with the primary user accessing the gaming environment;
   storing the generated restricted license within the license store, together with both (i) a first identifier that uniquely identifies the first user within the gaming environment and (ii) a second identifier that uniquely identifies the primary user within the gaming environment;
   receiving a request for the first user to access the gaming environment;
   determining that the primary user is currently accessing the gaming environment; and
   allowing the request from the first user to access the gaming environment, based on the restricted license, only in response to determining that the primary user and the third user are currently accessing the gaming environment.

7. The non-transitory computer-readable medium of claim 6, wherein a property is associated with the primary user that indicates a number of restricted licenses the primary user has the authority to grant, and wherein determining that the primary user has sufficient privilege to distribute the restricted license further comprises determining that the number of restricted licenses is greater than zero.

8. The non-transitory computer-readable medium of claim 6, wherein generating the restricted license is performed further responsive to determining that the license belonging to the primary user has not expired.

9. The non-transitory computer-readable medium of claim 6, wherein the license information associated with the restricted license includes a reference to the license belonging to the primary user.

10. The non-transitory computer-readable medium of claim 6, wherein the license information associated with the restricted license includes a time stamp indicating when the restricted license expires.

11. A computer system, comprising:
a processor; and
a memory configured to store instructions that, when executed by the processor, cause the processor to:
receive, from a primary user, a request to generate a restricted license for a first user not having access to the gaming environment;
determine, within a license store for the gaming environment, a license belonging to the primary user granting the primary user full access to the gaming environment;
upon determining that the primary user has sufficient privilege to distribute restricted licenses, generate the restricted license granting the first user only partial access to the gaming environment, wherein the partial access prevents the first user from accessing at least one feature of the gaming environment that is accessible to the primary user, and wherein the partial access granted by the restricted license only allows the first user to access the gaming environment via the first license simultaneously with the primary user accessing the gaming environment; store the generated restricted license within the license store, together with both (i) a first identifier that uniquely identifies the first user within the gaming environment and (ii) a second identifier that uniquely identifies the primary user within the gaming environment;
receive a request for the first user to access the gaming environment;
determining that the primary user is currently accessing the gaming environment; and
allowing the request from the first user to access the gaming environment, based on the restricted license, only in response to determining that the primary user and the third user are currently accessing the gaming environment.

12. The method of claim 1, further comprising:
upon a request from the first user, converting the restricted license into a full license, wherein the full license grants the first user full access to the gaming environment including the at least one feature.

13. The method of claim 1, wherein the license store also stores age information corresponding to the primary user.

14. The method of claim 1, wherein the license store also stores gender information corresponding to the primary user.

15. The method of claim 2, further comprising:
upon generating the restricted license, decrementing the number of restricted licenses that the primary user has the authority to grant.

16. The method of claim 2, further comprising:
upon a request from the primary user, revoking the restricted license belonging to the first user; and
incrementing the number of restricted licenses that the primary user has the authority to grant.

* * * * *